Aug. 18, 1964  B. LEIBINGER  3,144,798
SHEET CUTTING MACHINE
Original Filed Oct. 29, 1958  9 Sheets-Sheet 1

INVENTOR.
Berthold Leibinger
BY
Michael S. Striker
Attorney

Aug. 18, 1964     B. LEIBINGER     3,144,798
SHEET CUTTING MACHINE
Original Filed Oct. 29, 1958     9 Sheets-Sheet 2

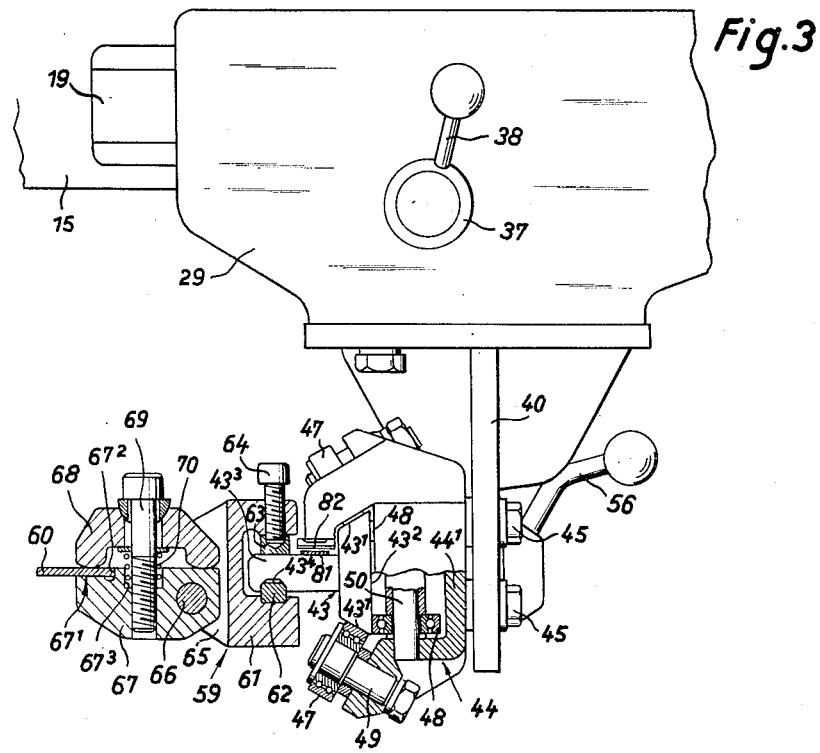
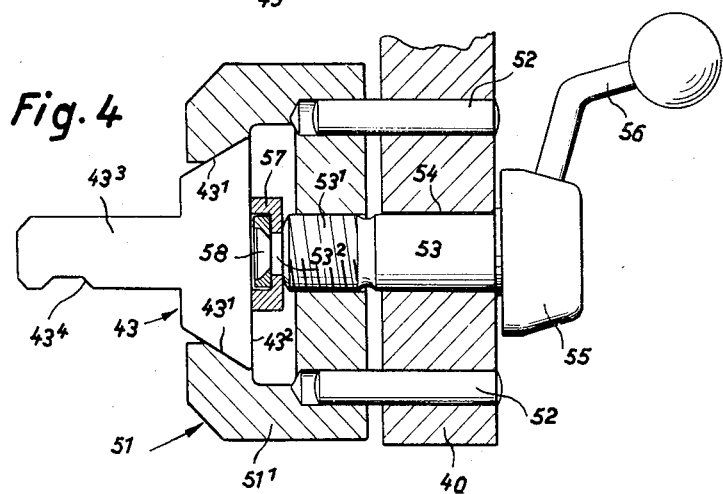

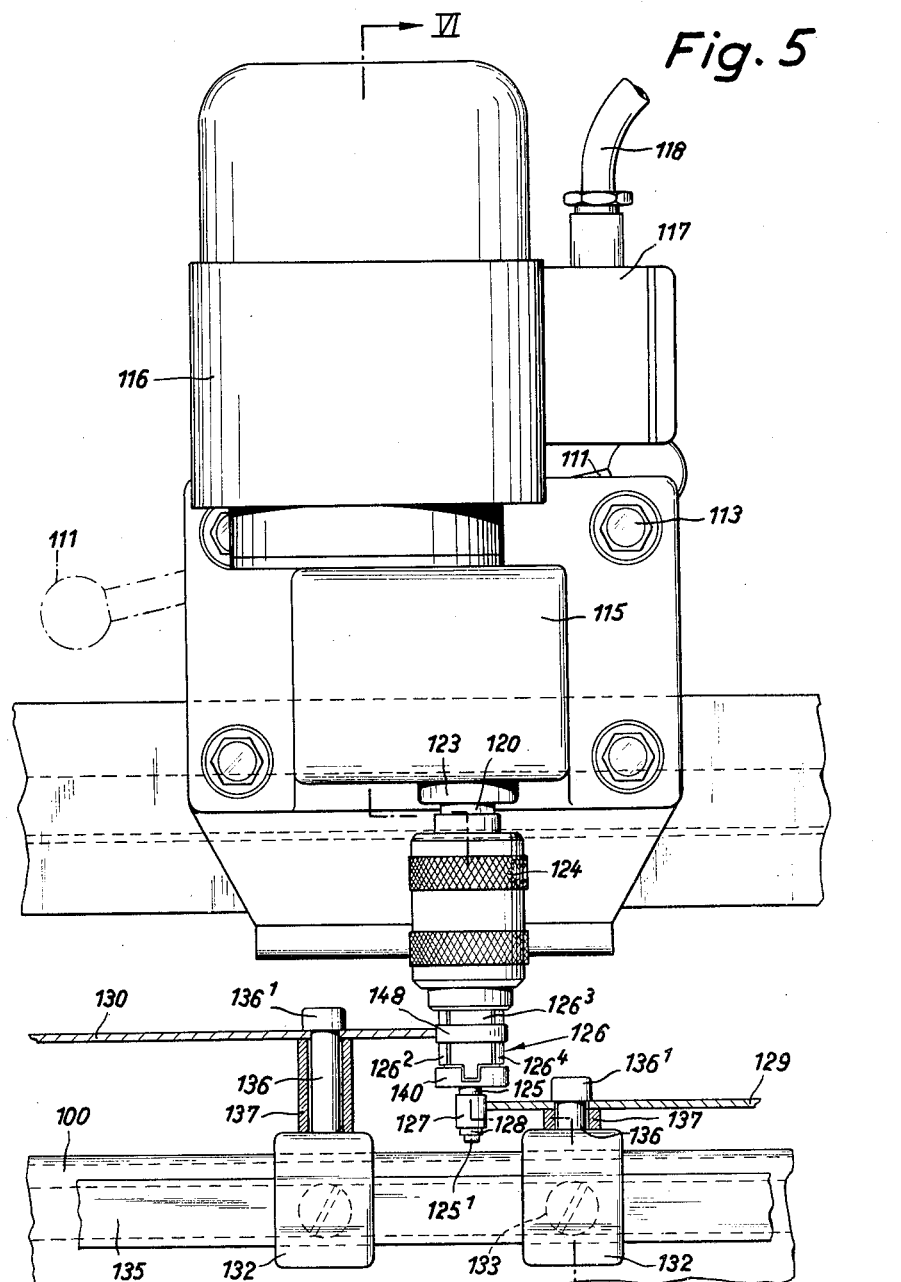

Aug. 18, 1964   B. LEIBINGER   3,144,798
SHEET CUTTING MACHINE
Original Filed Oct. 29, 1958   9 Sheets-Sheet 5
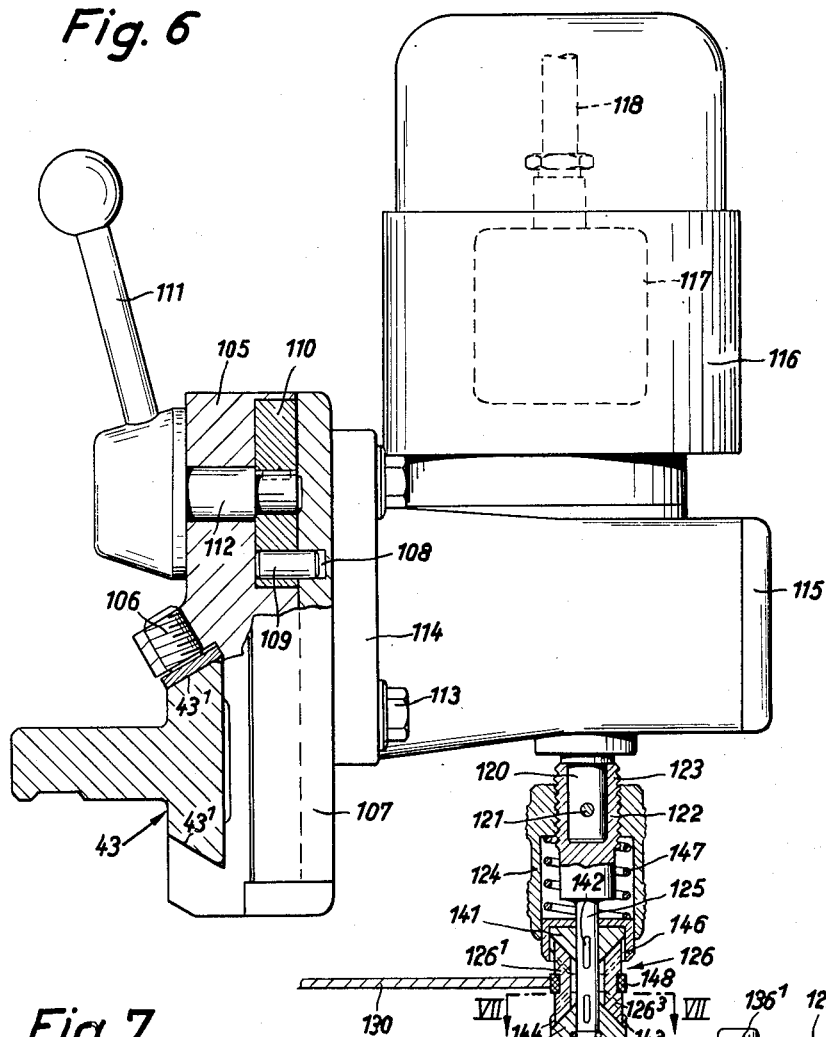
Fig. 6
Fig. 7
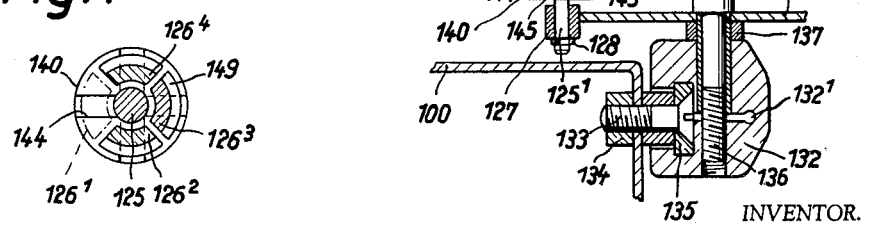
INVENTOR.
Berthold Leibinger
BY
Michael S. Striker
Attorney

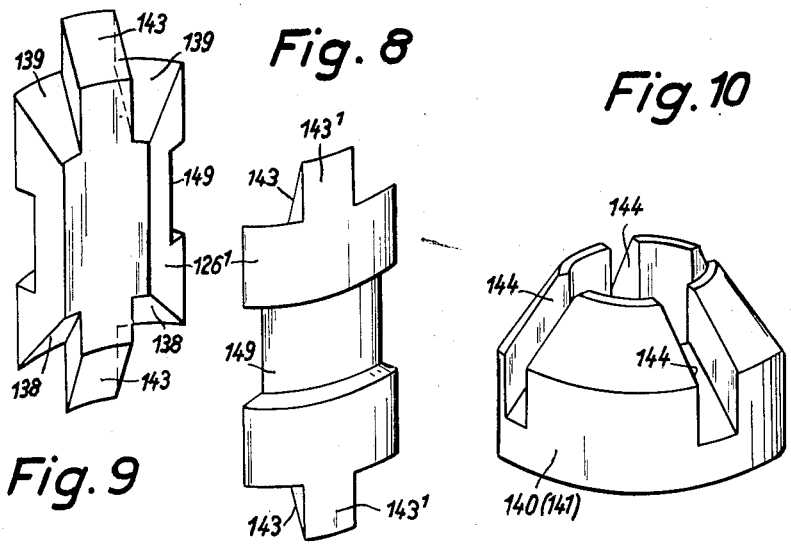
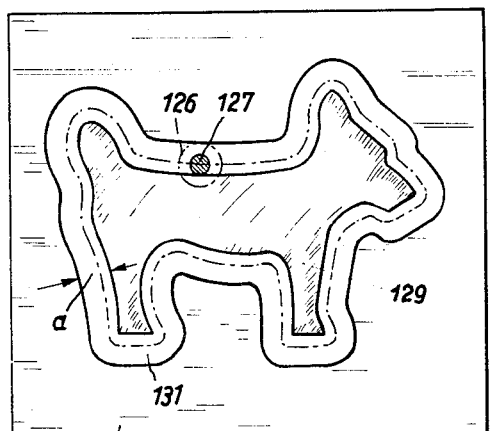
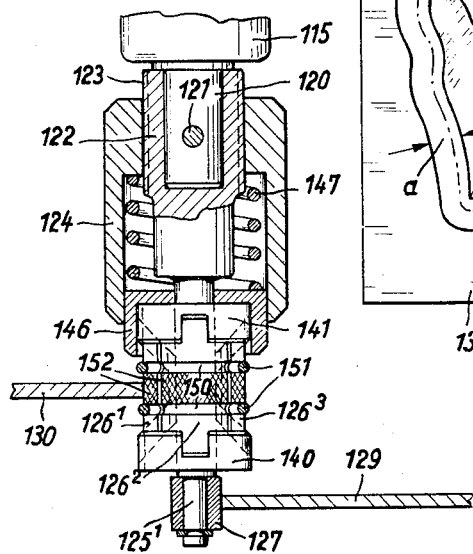

Aug. 18, 1964   B. LEIBINGER   3,144,798
SHEET CUTTING MACHINE
Original Filed Oct. 29, 1958   9 Sheets-Sheet 7

INVENTOR.
Berthold Leibinger
BY
Michael S. Striker
Attorney

Aug. 18, 1964    B. LEIBINGER    3,144,798
SHEET CUTTING MACHINE
Original Filed Oct. 29, 1958    9 Sheets-Sheet 8
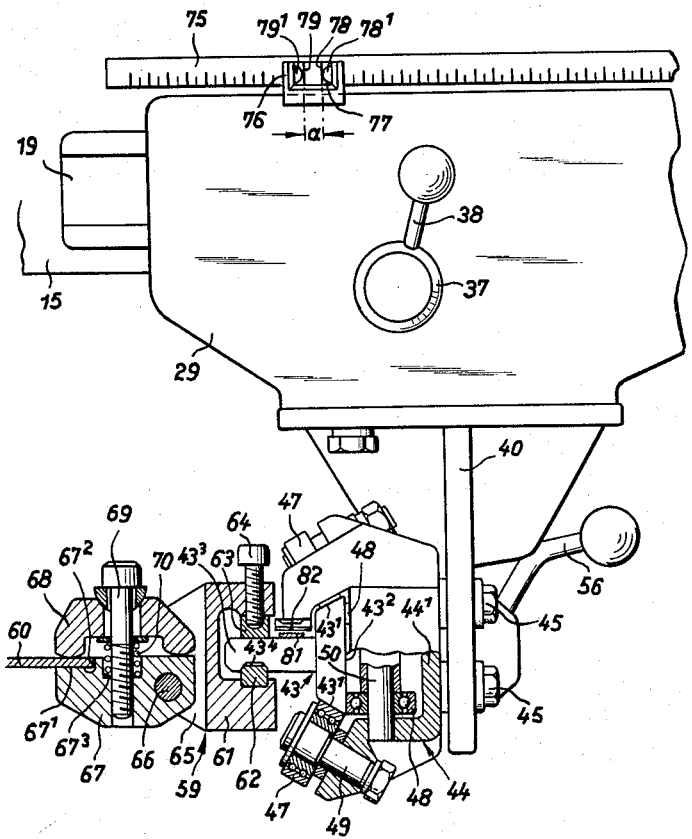
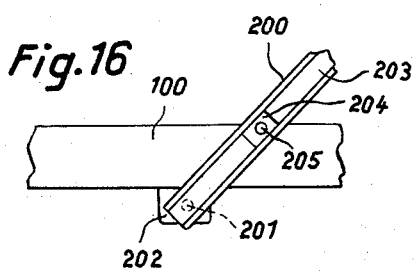
INVENTOR.
Berthold Leibinger
BY
Michael S. Striker
Attorney

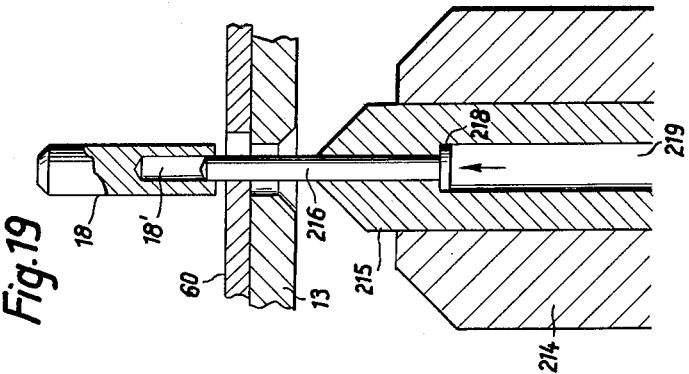
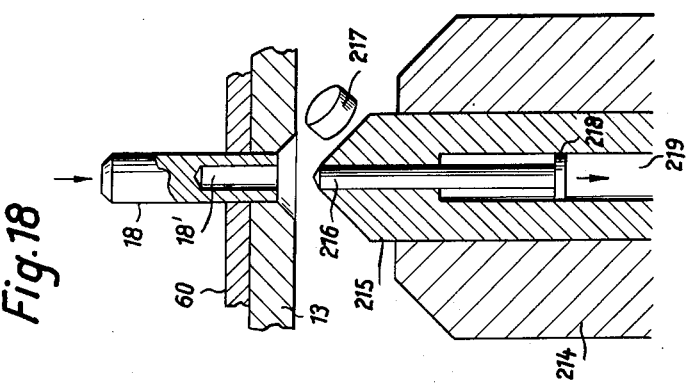
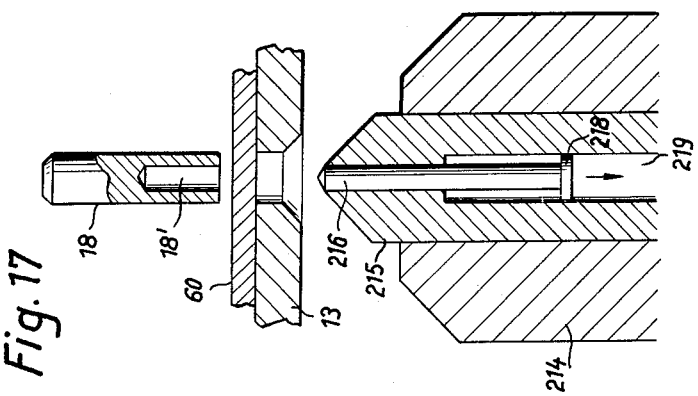

United States Patent Office 3,144,798
Patented Aug. 18, 1964

3,144,798
SHEET CUTTING MACHINE
Berthold Leibinger, Stuttgart-Weilimdorf, Germany, assignor to Messrs. Trumpf & Co., Stuttgart-Weilimdorf, Germany
Original application Oct. 29, 1958, Ser. No. 770,461, now Patent No. 3,058,380, dated Oct. 16, 1962. Divided and this application July 22, 1960, Ser. No. 44,650
Claims priority, application, Germany, Dec. 6, 1957, T 14,490; July 19, 1958, T 15,410; July 24, 1958, T 15,422
23 Claims. (Cl. 83—410)

The present invention relates to machine tools. This invention is a division of my prior application Serial Number 770,461, filed October 29, 1958, now Patent No. 3,058,380.

More particularly, the present invention relates to punch presses.

One of the objects of the present invention is to provide a punch press which is capable of cutting from a work sheet material extending along a predetermined path so as to form a slot in the work sheet which, when one of the ends of the slot become joined to each other, provides a sheet portion of predetermined configuration which is cut by the punch press from the work sheet.

Another object of the present invention is to provide a punch press of the above type which is not only capable of cutting along a predetermined path of the work sheet but which in addition is capable of automatically guiding the work sheet so as to cut therefrom a portion having a configuration determined by a template.

A further object of the present invention is to provide a punch press with a relatively simple and at the same time reliable work holding carriage structure which is capable of moving the work sheet in all directions in its own plane so that there is no restriction on the configuration of a portion of the work sheet which is cut therefrom by the punch press.

An additional object of the present invention is to provide for use in a machine tool of the above type a structure capable of reliably cooperating with a template so as to properly guide the work even though there may be inaccuracies in one part of the template as compared with another part thereof.

It is also an object of the present invention to provide for a machine tool of the above type an automatic feeding means for feeding the work sheet in various directions so as to automatically cut therefrom a portion of a predetermined configuration.

The objects of the present invention also include the provision of a machine tool of the above type which need not be operated from a template but which at the same time can be accurately controlled by the operator so as to cut the work sheet accurately in a desired manner.

It is also an object of the present invention to provide a punch press of the type which will not excessively wear the punch at one side thereof even though this one side of the punch is the side which does most of the work during the advance of the work sheet in a step-by-step manner to enable the punch to cut from the work sheet a portion thereof which will have a predetermined configuration.

With the above objects in view, the present invention includes in a machine tool for cutting a work sheet a punch press means having upper and lower substantially horizontal and parallel arms, this punch press means further including a reciprocable punch carried by the upper arm adjacent a front end thereof and a die carried by the lower arm adjacent a front end thereof beneath the punch to cooperate therewith. A longitudinally movable carriage means is carried by the upper arm of the punch press means between the upper and lower arms thereof for longitudinal movement along this upper arm toward and away from the punch of the punch press means, and this longitudinally movable carriage means itself carries a transversely movable carriage means which is movable longitudinally with the longitudinal carriage means and which at the same time is transversely movable with respect to the longitudinal carriage means and the arms. The transversely movable carriage means carries a work holding means which supports a work sheet in a given plane while the work sheet is acted upon by punch press means, and the longitudinal and transverse carriage means are capable of cooperating with each other so as to move the work sheet in all directions in the plane in which it is supported by the work holding means. Suitable scales may be provided to cooperate with both of the carriage means so that the extent of movement thereof can be determined by the operator to enable a cut of predetermined dimensions to be taken in the work sheet. However, it is also possible to support on an additional carriage carried by the lower arm of the punch press means a template, and a feed roller and template feeler carried by a motor which drives the feed roller and which itself is carried by the transverse carriage means may cooperate with the template for automatically operating the longitudinal and transverse carriage means so as to cut from the work sheet a portion having a configuration corresponding to that of the template. Furthermore, in order to prevent excessive wear of the punch, the latter is formed with an axial bore extending inwardly from its bottom end, and a guide pin is carried by the punch press means and extends into this axial bore to guide the punch for axial movement during its cutting of the work sheet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
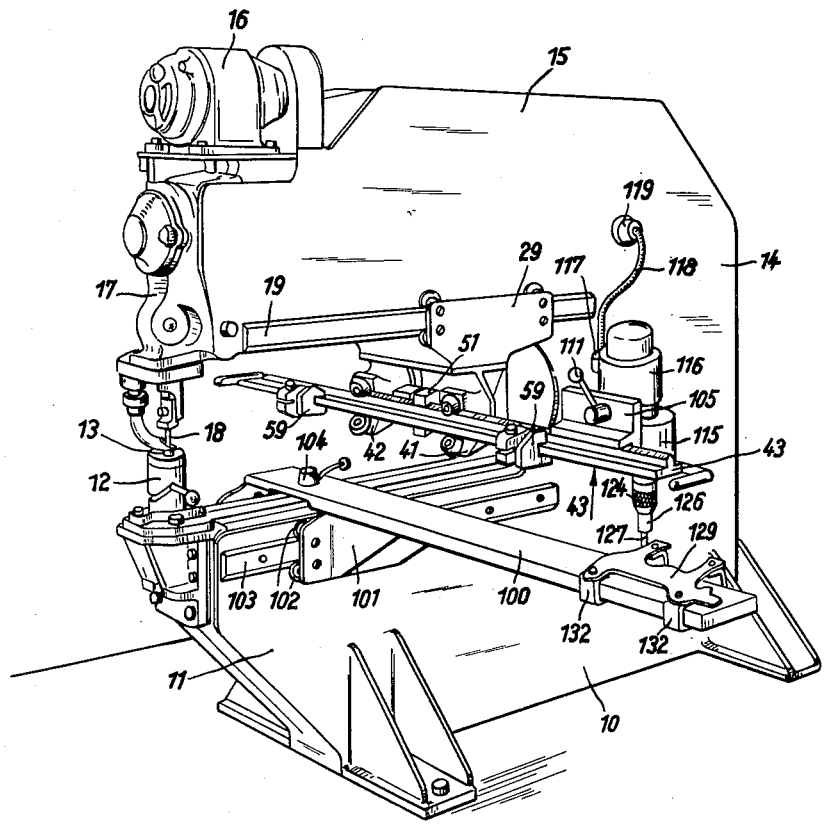
FIG. 1 is a partly schematic perspective view of a machine tool according to the present invention.
Figure 13:
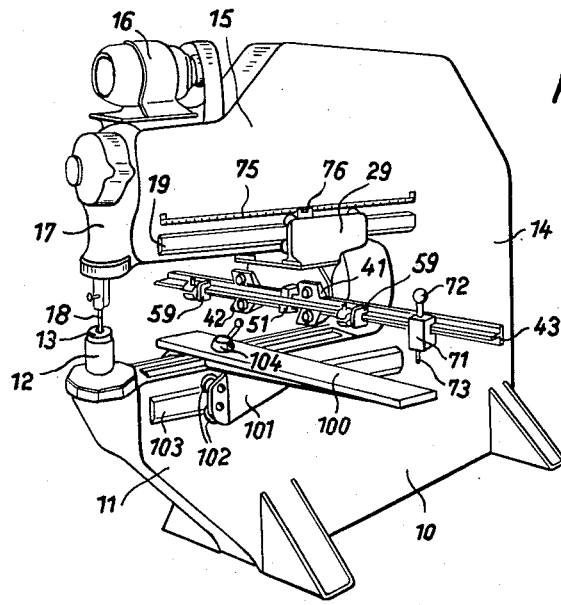
Figure 15:
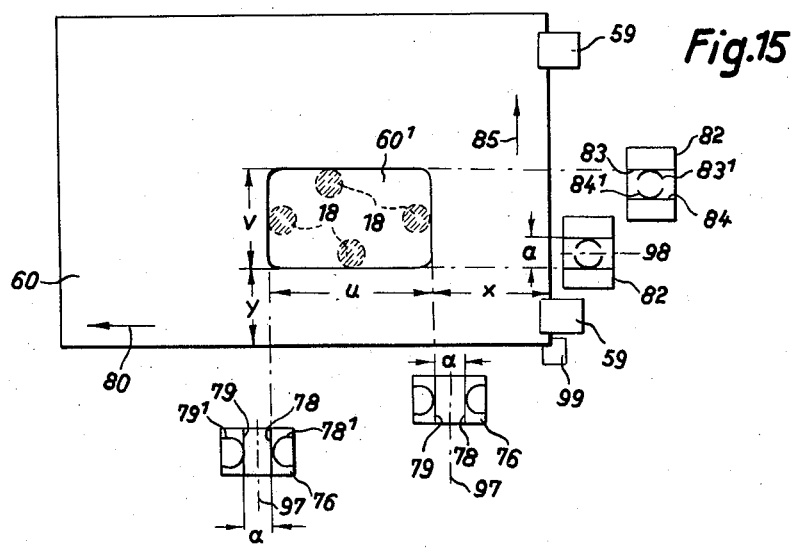

FIG. 3 is a fragmentary longitudinal, partly sectional side elevational view showing the longitudinal carriage as it appears from the right side of FIG. 1 and also showing in an end view the transverse carriage which is carried by the longitudinal carriage, FIG. 3 showing partly in section the structure which guides and supports the transversely movable carriage and also showing in section the work holding means which is carried by the transverse carriage;

FIG. 4 is a fragmentary partly sectional elevational view showing the structure for fixing the transversely movable carriage in a given position with respect to the longitudinally movable carriage;

FIG. 5 is an enlarged fragmentary elevational view, as compared with FIG. 1, showing the structure for automatically feeding the carriages from a template;

FIG. 6 is a sectional elevational view taken along line VI—VI of FIG. 5 in the direction of the arrows;

FIG. 7 is a sectional plan view taken along line VII—VII of FIG. 6 in the direction of the arrows;

FIG. 8 is a perspective elevation of a feed roller section according to the present invention;

FIG. 9 is a perspective elevation of the feed roller section of FIG. 8 as it appears from the side thereof which is not visible in FIG. 8;

FIG. 10 is a perspective view of a roller end wall adapted to cooperate with a plurality of the sections shown in FIGS. 8 and 9;

FIG. 11 is a fragmentary partly sectional elevational view showing another embodiment of the feed roller arrangement according to the present invention, FIG. 11 also showing the feeler roller of the present invention;

FIG. 12 is a top plan view of one possible template arrangement which may be used with the present invention;

FIG. 13 is a schematic side elevational view of the machine of FIG. 1 showing how it is adapted to be used without a template;

FIG. 14 is an enlarged illustration, as compared to FIG. 13, of the longitudinally movable carriage as it appears from the right side of the machine of FIG. 13, FIG. 14 showing how this carriage cooperates with a scale, and FIG. 14 also showing the scale which is used with the transversely movable carriage;

FIG. 15 is a diagrammatic view illustrating the manner in which the structure of FIGS. 13 and 14 operate to cut from a work sheet an opening of substantially rectangular configuration;

FIG. 16 is a fragmentary plan view showing how a structure may be mounted on the machine of FIG. 13 to cooperate with the carriages in order to automatically guide the latter to cut a circular opening in a work sheet;

FIG. 17 is a fragmentary schematic sectional elevational view showing a punch guiding structure of the present invention in an inoperative position;

FIG. 18 shows the structure of FIG. 17 after the punch has been moved down to the lowermost part of its stroke so as to cut an opening in a work sheet; and FIG. 19 shows the guide pin of FIGS. 17 and 18 in an operating position cooperating with the punch in order to guide the latter.

Referring now to the drawings, there is shown in FIG. 1 a punch press which includes a supporting frame 10 provided with an elongated lower horizontal arm 11 which carries at its front end a die carrier 12. A die 13 is carried by the die carrier 12 and is removable therefrom in a known way so as to be replaceable with another die. The frame 10 includes a rear portion 14 which serves to support an upper elongated arm 15 of the punch press, this upper arm 15 being parallel to and spaced above the lower arm 11 and also extending substantially horizontally over the lower arm 11. The upper arm 15 carries the driving motor 16 which operates through a suitable transmission 17 on the punch 18 to reciprocate the latter vertically in a known way, this punch 18 being carried by the upper arm 15 adjacent a front end thereof. This punch 18 is, in most cases, of cylindrical cross-section and is capable of cutting along the entire periphery of its bottom end face. Thus, the structure shown in FIG. 1 represents a punch press means which includes the upper arm 15, the lower arm 11, the reciprocable punch 18 carried by the upper arm 15 adjacent a front end thereof and the die 13 carried by the lower arm 11 adjacent a front end thereof beneath the punch 18 so as to cooperate with the latter.

Figure 2:
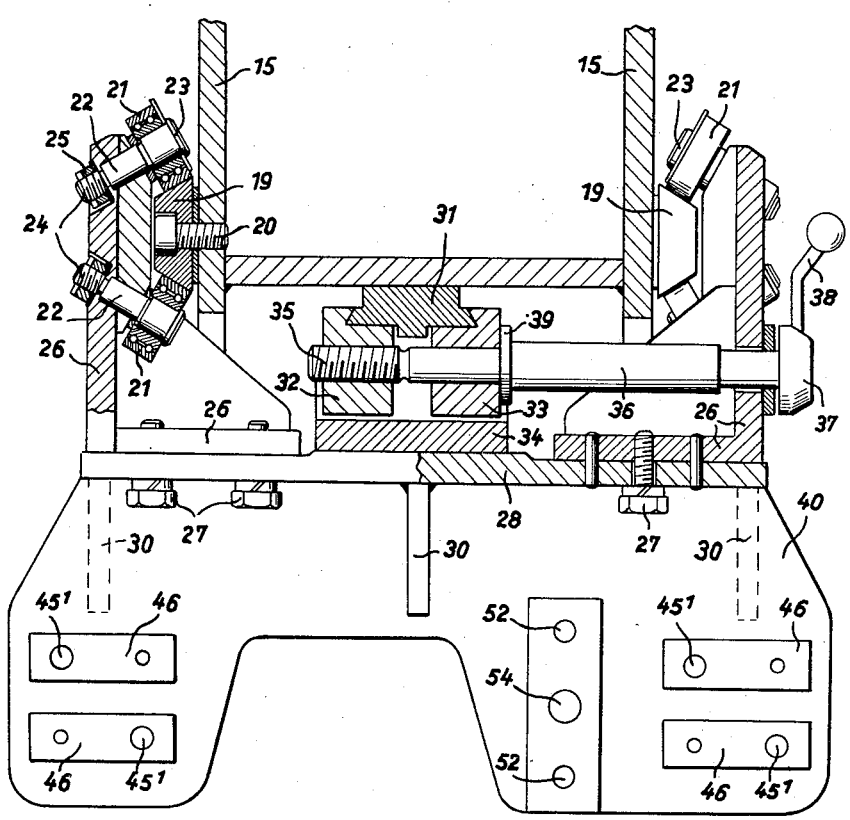
FIG. 2 is a fragmentary transverse sectional view of the structure of FIG. 1 showing the upper arm of the punch press in a transverse sectional view and showing also in a partly sectional transverse view the longitudinally movable carriage means of the present invention.

As may be seen from FIG. 2, the upper arm 15 includes a pair of spaced parallel vertical sidewalls, and a pair of elongated guides 19 are fixed to the exterior surfaces of the side walls of the arm 15 by screws 20 and extend horizontally along the exterior opposed side surfaces of the upper arm 15, in the manner indicated in FIGS. 1 and 2. These guide rails 19 are of trapezoidal cross-section. A plurality of rollers 21 are freely turnable along the oppositely inclined upper and lower faces of each guide rail 19. Each roller 21 is supported by a suitable ball bearing on a pin 22 for free turning movement with respect to the latter, and each pin 22 is provided at its end directed toward the arm 15 with an enlarged head 23 which engages the inner race of the ball bearing to prevent axial movement of this inner race. The opposite end of each pin 22 is provided with a threaded portion 24 so as to threadedly carry a nut 25 for fixing the pin 22 to a wall of an angle iron 26. As is shown at the left portion of FIG. 2, the vertical wall of the angle iron 26 is formed with a bore through which the pin 22 passes, this bore having a shoulder engaged by a shoulder of the pin 22 so as to limit the movement of the pin 22 away from the arm 15, and the nuts 25 serve to fix the pin 22 to the angle irons 26 in the manner shown at the left portion of FIG. 2.

A plurality of screws 27 serve to fix the lower portions of the pair of angle irons located at the opposite sides of the arm 15 to a transverse lower wall 28 which extends beneath the arm 15, so that the angle irons 26 together with the wall 28 form a substantially U-shaped carriage which embraces the lower porton of the arm 15. Thus, this structure forms the longitudinal carriage means 29 which is longitudinally movable along the upper arm 15 toward and away from the punch 18 and which is located in part between the arms 15 and 11. The lower wall 28 of the carriage 29 is provided with stiffening ribs or plates 30.

A suitable means is provided for releasably fixing the longitudinally movable carriage 29 in a desired position along the upper arm 15, and this means includes an elongated rail 31 (FIG. 2) fixed to and extending along the underside of the upper arm 15. This rail 31 has a substantially dovetail cross-section, as shown in FIG. 2, and a pair of gripping members 32 and 33 engage the opposite side edges of the rail 31. These gripping members 32 and 33 are transversely shiftable in a guide member 34 of substantially U-shaped cross-section which is fixed to the top surface of the wall 28 beneath the arm 15. The gripping member 32 is formed with a threaded bore passing therethrough, and an externally threaded pin 35 extends threadedly into this bore. This pin 35 is fixed at its right end, as viewed in FIG. 2, to an elongated spindle 36 which passes freely through a bore of the gripping member 33, and the spindle 36 passes freely through an opening in the vertical wall of the right member 26 of FIG. 2 so as to be accessible at the exterior of the longitudinal carriage 29. At its outer right end, as viewed in FIG. 2, a handle 38 is fixed at its hub 37 to the spindle 36 so that upon turning of the handle 38 the spindle 36 will turn about its axis. The spindle 36 is provided next to the gripping member 33 with an annular flange 39 extending radially from the spindle 36 and pressing with its left face, as viewed in FIG. 2, against the gripping member 33. Thus, by turning the spindle 36 in one direction the gripping members 32 and 33 may be drawn toward each other so as to tightly grip the rail 31 for fixing the carriage 29 in a predetermined longitudinal position along the upper arm 15, while turning of the spindle 36 in the opposite direction will cause the gripping members 32 and 33 to move apart from each other so as to release the carriage 29 for movement longitudinally along the upper arm 15. The guide 34 for the gripping members 32 and 33 not only guides them for movement toward and away from each other, but this guide member 34 acts additionally to prevent turning of the gripping members 32 and 33.

A substantially vertical carrier wall 40 extends transversely with respect to the arm 15 across the underside of the plate 28 and is fixed to the latter. It will be noted from FIG. 2 that one stiffening plate 30 is located in front of the plate 40, while the other two stiffening plates are located to the rear of the plate 40, and the latter may be fixed to the underside of the wall 28 in any suitable way as by being welded thereto, for example. Also, the plates 30 may be fixed to the underside of the wall 28 as by being welded thereto, for example. As may be seen from FIG. 1, this carrier wall 40 carries a pair of guide means 41 and 42 which serve to support and guide a transverse carriage 43 for transverse movement with respect to the longitudinal carriage 29. Thus, the transverse carriage 43 is carried by the longitudinal carriage 29 for movement with the latter longitudinally of the arm 15, and at the same time the carriage 43 is movable transversely of the carriage 29 and the arm 15.

Each of the bearing means 41 and 42 includes a substantially U-shaped member 44 (FIG. 3) which is fixed to the front face of the carrier wall 40. The vertical wall 44' of the member 44 is fixed by the screws 45 to the wall 40, these screws 45 extending respectively through the openings 45' formed in the wall 40 (FIG. 2). At its front face the wall 40 has protections thereof which are machined so as to provide the smooth surfaces 46 which are very precisely positioned for receiving the members 44 so as to accurately position the latter. The upper and lower portions of each U-shaped member 44 serve to support the rollers 47 and 48 which cooperate with the transverse carriage 43 to guide the latter.

This transverse carriage 43 is made of an elongated bar of substantially T-shaped cross-section, and the rear vertical wall of this bar (FIGS. 3 and 4) is formed with a pair of oppositely inclined upper and lower surfaces 43' so that the rear wall of the T-bar has a substantially dovetail cross-section. The upper and lower rollers 47 are suitably inclined so as to cooperate with the surfaced 43', respectively, for guiding the transverse carriage 43. These rollers 47 are respectively carried by pins 49 in the manner shown most clearly at the lower portion of FIG. 3, and these pins 49 are fixed to the upper and lower edge portions of each member 44. The guide rollers 48 engage the rear face $43^2$ of the rear wall of the carriage 43, and these rollers 48 are carried by a vertical pin 50 which is in turn carried by the member 44 in the manner shown in FIG. 3 and serve to turnably support the rollers 48.

The carriage 43 is easily movable along the above-described guide means transversely of the carriage 29 and the arms 15 and 11. The carriage 29 carries a device 51 (FIG. 4) which serves as a means for releasably fixing the transverse carriage 43 in any desired position with respect to the carriage 29. Thus, as may be seen from FIG. 4, the device 51 includes a substantially U-shaped gripping member 51' which is supported by guide pins 52 for movement toward and away from the wall 40. These guide pins 52 are fixed to the wall 40 and extend substantially horizontally in a direction perpendicularly therefrom into mating bores of the member 51 which respectively slidably receive the guide pins 52 in a manner shown in FIG. 4. At its free left ends, as viewed in FIG. 4, the clamping member 51' is provided with inclined surfaces which are respectively inclined in the same way as and engage the surfaces 43' of the carriage 43. A spindle 53 of the device 51 extends freely through a bore 54 of the wall 40, and at the rear face of the wall 40 the spindle 53 is fixed to a hub 55 of a handle 56 which may be turned by the operator in order to turn the spindle 53. At its portion which extends forwardly from the wall 40 the spindle 53 is provided with a thread 53' which threadedly cooperates with a threaded bore of the clamping member 51'. The spindle 53 has an extension $53^2$, and this extension has a smaller diameter than the threaded portion 53' of the spindle 53. This extension of the spindle extends into an opening of a pressure member 57 which is freely turnable on the extension $53^2$ of the spindle 53. A screw member 58 is threaded into the spindle 53 from its left end, as viewed in FIG. 4, and a suitable washer is located between the head of the screw member 58 and the pressure member 57 as indicated in FIG. 4, so that in this way the pressure member 57 is carried by the spindle 53 after the latter is passed through the aligned bores of the wall 40 and the clamping members 51'. When the handle 56 is turned in one direction, the spindle 53 will be turned so as to thread the portion 53' thereof into the clamping member 51', and since the latter cannot turn as a result of the cooperation of the guide pins 52 with the member 51', the latter will be drawn toward the wall 40 so as to cause the clamping member 51 to clamp tightly against the upper and lower faces of the rear wall of the carriage 43. Continued turning of the spindle 53 in this direction will cause the pressure member 57 to press against the rear face of the transverse carriage 43, and in this way the rear wall of the carriage 43 is tightly clamped between the member 51', on the one hand, and the pressure member 57, on the other hand, and thus it is possible to fix the transverse carriage 43 in any desired position with respect to the carriage 29, as when it is desired to advance the work only longitudinally. When the spindle 53 is turned by the operator in the opposite direction the device 51 is actuated so as to release the transverse carriage 43 for free movement with respect to the longitudinal carriage 29.

The transverse carriage 43 carries a holding means which serves to support the work sheet in a predetermined plane while it is being acted upon by the punch press so that this work sheet can be moved in all directions in this plane. For this purpose the forwardly extending horizontal wall $43^3$ of the carriage 43 is formed in its underside with an elongated groove $43^4$ extending longitudinally along the carriage 43 and having a substantially trapezoidal cross-section, as indicated in FIG. 4. The work holding means includes a pair of devices 59 which are identical with each other and spaced from each other along the carriage 43, as shown in FIG. 1. The details of each of the devices 59 is indicated in FIG. 3. Thus, each device 59 includes a substantially U-shaped member 61 which embraces the front free edge of the carriage 43. The lower portion of each member 61 is formed with an upwardly directed recess which receives a slide block 62 which is fixed in this way to each member 61, and the slide block 62 is slidable along the lower groove formed in the horizontal wall of the carriage 43. Between the upper portion of each member 61 and the horizontal wall of the carriage 43 is a pressure member 63 which is engaged by the bottom end of a screw 64 extending threadedly through the upper portion of the member 61, and thus by tightening the screw 64 it is possible to fix the member 61 of each device 59 at a desired position along the carriage 43 for movement with the latter.

Each member 61 is provided with a pair of forwardly extending spaced side walls 65 which carry a horizontal pivot pin 66 which extends across the space between the side walls 65. A gripping means is turnably supported by the pivot pin 66, and this gripping means has a lower portion 67 extending into the space between the walls 65 and formed with a bore through which the pivot pin 66 passes so that the member 67 is freely turnable about the horizontal axis of the pivot pin 66. This gripping means includes in addition to the lower part 67 and upper gripping jaw 68 formed with a bore through which a bolt 69 passes, this bolt 69 having a lower threaded portion which cooperates threadedly with a threaded bore of the lower gripping member 67. As is apparent from FIG. 3, the head of the bolt 69 cooperates with a suitable washer which bears against the upper gripping member 68, and a spring 70 is coiled about the bolt 69 and bears against a washer which is urged by the spring 70 against the upper member 68 and also against a shoulder formed in an enlarged portion $67^3$ of the threaded bore of the member 67. Thus, the spring 70 will urge the jaws of the gripping device 67, 68 apart from each other when the screw 69 is loosened. It will be noted from FIG. 3 that the lower jaw member 67 is provided with substantially perpendicular plane surfaces 67' and $62^2$ which respectively engage surfaces of the work sheet 60 which may be sheet metal, for example. Thus, the vertical surface $67^2$ forms a stop which cooperates with an edge of the work sheet to precisely determine the position of the work sheet with respect to the work holding means.

The structure of the invention includes a third carriage 100 which is longitudinally movable along the lower arm 11 of the punch press means. This carriage 100 includes a supporting portion 101 which is guided by rollers 101 for movement longitudinally along the rails 103 in the same way that the carriage 29 is supported by the rollers 21 for movement along the rails 19, so that the details of the structure which supports the carriage 100 need not be described, this structure having the same details as the structure shown in FIG. 2 for the carriage 29. The carriage 100 is additionally provided with a releasable clamping device 104 of any suitable construction for releasably fixing the carriage 100 in any desired position along the lower arm 11.

The carriage 100 serves to support a template which through a suitable structure cooperates with the carriages 29 and 43 for automatically moving a work sheet 60 while it is being acted upon by the punch 18 and the die 13 so as to cause the punch 18 and the die 13 to cut from the work sheet a portion thereof which will leave a work sheet portion having a configuration corresponding to that of the template. The structure for automatically controlling the carriages 29 and 43 in this manner is shown in FIGS. 5-12.

This structure for automatically moving the carriages includes a base member 105 (FIG. 6) formed with a substantially dovetail slot which receives the rear wall of the carriage 43 in a manner shown in FIG. 6 so that the entire structure for controlling the carriages is carried by the transverse carriage 43. This base or carrier member 105 receives a plurality of screw members 106 which may be turned by the operator so as to press suitable pressure plates against the upper surface of the rear wall of the carriage 43 in a manner shown in FIG. 6 for releasably fixing the carrier plate 105 in any desired position along the carriage 43. The carriage 43 thus carries the entire structure for controlling the movement of the carriages. The base plate 105 is provided at its right face, as viewed in FIG. 6, with a vertically extending guiding protection of dovetail cross-section which is slidably received in a mating dovetail groove of a slide member 107 which is thus guided for vertical movements upwardly and downwardly with respect to the carrier member 105. This slide member 107 is formed in its face which is directed toward the member 105 with a horizontally extending groove 108, and a pin 109 extends into this groove 108 in the manner shown in FIG. 6. The pin 109 is fixedly carried by a disk 110 which is supported at its center for turning movement on the carrier member 105, and it will be noted that the pin 109 is spaced radially from the center of the disk 110, so that the parts 109 and 110 form a crank which will raise and lower the slide 107 upon turning of the disk 110 around its axis. The horizontal groove 108 which receives the pin 109 is long enough to provide for complete turning of the disk 110. In other words, the length of the groove 108 is at least equal to the diameter of the circle described by the pin 109 during turning of the disk 110. This disk 110 is fixed to a shaft 112 which is turnably supported by the carrier member 105, and a handle 111 is fixed to the shaft 112 to enable the operator to turn the shaft 112 for the purpose of raising or lowering the slide member 107.

A plurality of screw members 113 serve to fix to the right face of the vertical slide member 107 a base member 114 of a transmission housing 115 which houses an unillustrated transmission providing a gear reduction for the drive from a motor 116 carried by the housing 115. The electric motor 116 has its exterior housing connected to an enclosure 117 for the electrical leads of the motor which are connected with the cable 118 which is connected to and extends from the enclosure 117, and this cable 118 is provided at its end distant from the motor 116 with a plug 119 cooperating with a socket carried by the machine in a manner shown in FIG. 1 and connected in any suitable way with a source of electrical current for supplying the motor 116.

The bottom wall of the transmission housing 115 is formed with an opening through which the drive shaft 120 passes, and this drive shaft 120 carries a cross pin 121 which serves to fix to the drive shaft 120 a sleeve 122 which receives in its interior the drive shaft 120 and which extends downwardly from the shaft 120 so as to form a downward extension thereof. The sleeve 122 is formed with exterior threads 123 which serve to threadedly mount on the upper portion of the sleeve 122 an outer sleeve 124 which is open at its lower end, as indicated in FIG. 6. Beneath the shaft 120 the sleeve 122 is fixed with a coaxial extension 125 of the shaft 120, and this extension 125 carries a feed roller means 126 which turns with the sleeve 125 and which is coaxial therewith. The extension 125 is formed at its lower portion with an elongated part 125' of reduced outer diameter, and this lower portion 125' of the extension 125 is coaxial with the drive shaft 120 and serves to turnably support a feeler roll 127 for free turning movement about the portion 125'. The outer diameter of the feeler roll 127 is the same as the diameter of the cylindrical punch 18. Adjacent its bottom end the portion 125' of the extension 125 is formed with an annular groove which receives a snap ring 128 against which the bottom face of the roll 127 rests, so that in this way the roll 127 is prevented from falling from the guide shaft portion 125'.

The feeler roll 127 engages the exterior periphery of a positive template 129 provided at its exterior periphery with a configuration corresponding to that of the piece which is to be cut from the work sheet 60. The term "positive template" is intended to refer to a template which has an outer edge of predetermined configuration which serves as a guide. It will be noted from FIGS. 5 and 6 that the positive template 129 is parallel to and located at a lower elevation than a cooperating negative template 130. The term "negative template" is intended to refer to a template formed with an opening defined by an edge of a configuration corresponding to that of the positive template. In FIG. 1 only the positive template 129 is shown for the sake of clarity. It is to be understood, however, as indicated in FIGS. 5 and 6, that the negative template 130 is supported at an elevation higher than the positive template 129 and has its inner peripheral edge located outwardly of the outer peripheral edge of the template 129. If the inner peripheral edge of the template 130 and the outer peripheral edge of the template 129 are projected onto a common horizontal plane, it will be seen that these edges have substantially the same configuration with the edge of the negative template being larger than and surrounding the edge of the positive template. This relationship between the positive template 129 and negative template 130 is illustrated in FIG. 12 from where it may be seen that when the two templates are located in a common horizontal plane the distance between the outer edge of the positive template and the inner edge of the negative template is equal to the distance $a$ indicated in FIG. 12. This distance $a$ is equal to the width of the gap 131 illustrated in FIG. 12 between the templates, and this distance $a$ is equal to one half the sum of the diameters of the feed roller 126 and the feeler roll 127. When automatically guided by the templates shown in FIG. 12, the work sheet will be moved with respect to the punch 18 so that the latter will cut from the work sheet a portion thereof having the configuration of the template 129.

As may be seen from FIGS. 5 and 6, an elongated guide rail 135 is carried by a front wall of the carriage 100, and a similar unillustrated guide rail is carried by the rear wall of the carriage 100. As is shown particularly in FIG. 6, the guide rail 135 is fixed to the carriage 100 by screw member 133 passing through a bore in the wall of the carriage 100 and cooperating with a nut 134, a suitable spacer sleeve and washer being located between the head of the screw member 133 and the carriage 100 for fixing the rail 135 to the latter. A plurality of holders 132 form part of the support means for the templates. Each of these holders 132 has a cross-sectional configuration illustrated in FIG. 6, and it will be seen from FIG. 6 that these holders 132 are slidable along the rails 135. In addition, the holders 132 are formed with horizontal slots 132' which permit the upper and lower portions of each holder 132 to be drawn toward each other so as to be clamped on the rail 135 in a desired position. For this purpose each holder 132 is vertically bored, and the portion of the vertical bore beneath the slots 132' is threaded. A bolt 136 extends threadedly into the bore of the holder 132 and cooperates with the threaded lower portion of the bore of the member 132. The head 136' of the bolt 136 bears against the top surface of the template, and a spacer 137 through which the bolt 136 passes is located between the holder 132 and the lower surface of the template to determine the elevation of the latter. Thus, as may be seen from FIG. 5, the only difference between the support means for the positive template 129 and the support means for the negative template 130 is that the spacers 137 have different lengths and of course the bolts 136 will also have different lengths. In this way, the negative template 130 is supported at a higher elevation than the positive template 129. When the bolts 136 are tightened, not only do they press the template against the spacer 137, but also they draw together the upper and lower portions of each holder 132 so as to clamp the latter on the rail 135 and thus fix the position thereof.

In order to guarantee continuous engagement between the feeler roll 127 and the outer edge of the positive template 129 and on the other hand continuous engagement between the feed roller means 126 and the inner edge of the negative template 130, so as to provide sufficient frictional engagement between the feed roll means 126 and the negative template 130, this feed roll means 126 is constructed so that it can automatically change its diameter in order to compensate for variations in the width $a$ of the gap 131, such variations resulting from inaccuracies which occur in the manufacture of the templates. The details of the feed roll means which enables it to accomplish this result are illustrated in FIGS. 5–11. Referring first to FIGS. 5–10, it will be seen that the feed roll means 126 is composed of a plurality of longitudinal roller sections 126' shown in FIGS. 8 and 9. Actually, in the illustrated example there are four such separate roller sections 126', $126^2$, $126^3$ and $126^4$ which are separate from each other, as indicated in FIG. 7, which extend parallel to the axis of the feed roll, and which are distributed about this axis. The details of the roller section 126', shown in FIGS. 8 and 9, are included in each of the four feed roller sections. As may be seen from FIGS. 8 and 9, each of these longitudinal roller sections is provided with upper and lower extensions 143' which terminate in a pair of inclined opposed end faces 143. These end faces 143 of the several roller sections form portions of the surface of a pair of cones. The feed roller means 126 in addition includes a pair of end walls 141 and 140, and these end walls are of an identical construction. The details of each end wall are shown in FIG. 10 from where it may be seen that each of these end walls is provided with a plurality of radial grooves 144. In the illustrated example there are four such grooves 144, and the base surface of each of these grooves also forms a port of a cone. As may be seen particularly from FIG. 6, the end walls 140 and 141 are formed with a pair of aligned coaxial bores through which the extension 125 passes, and this extension 125 carries a pair of keys 142 located in axial grooves of the end walls 140 and 141 so that these end walls are constrained to turn with the extension 125 while being axially movable therealong. The projections 143' of the several sections $125'-126^4$ respectively extend into the grooves 144, and the end faces 143 cooperate with the base surfaces of these grooves, respectively, so as to be slidable with respect thereto. It will be noted from FIG. 6, that the base surfaces of the grooves as well as the end faces 143 form surface portions of a pair of cones whose apexes are directed toward each other and whose bases are directed away from each other. It will be noted that at the opposite side of each projection 143', each of the roller sections $126'-126^4$ is formed with a pair of surfaces shown in FIG. 9. Thus, it may be seen from FIG. 9 at each side of the lower projection the roller section is formed with a pair of surfaces 138 and at each side of the upper projection a pair of surfaces 139 are provided, and these surfaces 138 and 139 are respectively slidable along the exterior frusto-conical surfaces of the end walls which extend between the radial grooves 144 thereof. As a result of the extension of the projections 143' into the grooves 144, the several longitudinal roller sections are constrained to turn with the end walls 140 and 141. Furthermore, as these end walls approach each other the roller sections will necessarily move outwardly away from the axis of the shaft extension 125, while when the end walls 140 and 141 move away from each other, these roller sections $126'-126^4$ are free to move inwardly toward the axis of the shaft extension 125.

As may be seen from FIG. 6, the shaft extension 125 is provided at the top end of the portion 125' thereof with an annular groove which receives a snap ring 145, and the lower end wall 140 rests on this snap ring so that the lower end wall 140 cannot move downwardly beyond the position thereof indicated in FIG. 6. The upper end wall 141 is received in the interior of a sleeve 146 which has a top end wall through which the shaft extension 125 freely passes. The lower annular portion of the sleeve 146 surrounds the upper portions of the longitudinal roller sections $126'-126^4$, so as to limit the movement of these roller sections outwardly away from the axis of the shaft extension 125. Furthermore, it will be noted that the sleeve 146 extends slidably into the sleeve 124, and a coil spring 147 is housed within the sleeve 124, pressing with its bottom end against the sleeve 146 and with its top end against the top wall of the sleeve 124. Therefore, this coil spring 147 urges the upper end wall 141 downwardly toward the lower end wall 140 so as to continuously urge the longitudinal roller sections outwardly away from the axis of the shaft extensions 125.

As may be seen from FIG. 8, each of the longitudinal roller sections is formed with an arcuate groove 149 between its ends. The several grooves 149 extend along a common circle and receive an annular elastic band 148 of rubber or the like. This band 148 serves to uniformly move all of the roller sections inwardly toward the axis of the shaft axis 125, so that the longitudinal roller sections are always located equidistant from this axis. Furthermore, the band 148 serves as a friction material engaging the inner periphery of the negative template 130 to guarantee that there is sufficient friction between the feed roll means 126 and the negative template to guarantee the necessary feeding of the carriages. The spring 147 is of course stronger than the elastic force of the band 148 and guarantees that if there are any inaccuracies in the width of the gap 131 which cause this width to become larger, the upper end wall 141 will immediately move downwardly toward the lower end wall 140 so as to spread the roller sections outwardly away from each other and reliably maintain the feed roll means 126 in engagement with the negative template 130. On the other hand, if the width $a$ of the gap 131 (FIG. 12) should become smaller, then the edge of the negative template 130 will act to move the longitudinal roller sections next to the template 130 inwardly toward the axis of the shaft extension 125, and all of the feed roller sections will necessarily move also inwardly toward this axis by the same amount as the result of the elastic band 148. In this way the feed roll means 126 is capable of automatically adapting itself to variations in the width of the gap 131 (FIG. 12) while at the same time guaranteeing sufficient frictional contact between the feed roll means 126 and the edge of the negative template 130 to provide the desired movement of the carriages.

In the embodiment of the invention which is illustrated in FIG. 11, instead of a groove 149 as shown in FIG. 8, the several longitudinal feed roller sections are formed with pairs of exterior grooves axially spaced from each other and respectively receiving the elastic rings 151 shown in FIG. 11. These rings 151 act in the same way as the ring 148 to guarantee that all of the longitudinal roll sections move inwardly toward the axis of the shaft extension 125 by the same amount. Between the rings 151 the exterior surfaces of the several longitudinal roll sections are suitably roughened at 152 (FIG. 11) as by being knurled, for example, so as to provide a high frictional contact between the surfaces 152 and the inner edge of the negative template 130.

It is apparent that with the above-described structure the carriages 29 and 43 will be automatically controlled according to the configuration of the templates so as to automatically move the work sheet 60 in all directions in its own plane to cause the continuously reciprocating punch 18 to punch from the work sheet a slot corresponding to the configuration of the gap 131 shown in FIG. 12, and when one end of the slot reaches the starting end thereof, a piece corresponding to the configuration of the positive template 129 will have been cut by the punch press from the work sheet. The transmission 17 which may be of any suitable well known construction for continuously and rapidly reciprocating the punch 18 causes the latter to move continuously up and down so as to continuously cut away portions of the work sheet during the movement thereof by the carriages.

In order to be able to replace one pair of positive or negative templates with another pair or in order to stop the automatic operation so that the machine may be manually operated, it is only necessary to turn the handle 111 so as to cause the slide member 107 to be raised, and this will result in elevation of the feed roll means 126 and the feeler roller 127 beyond the templates 129 and 130 so that the carriage 100 or the carriage means 29, 43 may be actuated to place the templates out of alignment with and spaced from the feed roll means and feeler roll to give free access to the templates for changing the same.

The machine of the invention is capable of being manually operated where cutouts of regular configuration are to be cut from the work sheet. For example, where the cutouts are to be of a simple rectangular configuration or circular configuration it is unnecessary to use templates, and the machine can be manually operated at this time. The structure which is used with the machine for this purpose is shown in FIGS. 13–16. Thus, referring to FIG. 13, it will be seen that the transverse carriage 43 carries a block 71 which is slidably mounted for movement along the forwardly extending horizontal wall of the carriage 43. This block 71 is formed with a groove which receives the horizontal wall of the carriage 43 so as to embrace this horizontal wall at its front edge in a manner similar to the members 61 of the devices 59. This block 71 may be provided with a slide block similar to the block 62 for sliding along the groove in the bottom face of the horizontal wall of the carriage 43, and it may also be provided with a clamping screw and pressure plate similar to the screw 64 and plate 63 so that the block 71 may be clamped to the carriage 43 at any desired position therealong. A handle 72 is fixed to and projects upwardly from the block 71, so that the operator may grasp the handle 72 for moving both of the carriage 43 and the carriage 29 as desired. Furthermore, an elongated projection 73 is fixed to and extends downwardly from the block 71 for a purpose described below in connection with FIG. 16.

In order to be able to operate the machine easily from dimensions taken from working drawings, the exterior side surface of the upper arm 15 of the punch press has mounted thereon an elongated scale 75 along which the carriage 29 is movable, this scale 75 being provided with any desired graduations such as inches, for example. The scale 75 is illustrated in FIGS. 13 and 14. The carriage 29 carries at its upper edge which is adjacent to the scale 75 a transparent window 76 which moves with the carriage 29. The window 76 includes an outer frame and a transparent glass member 77 carried thereby, and a pair of indexes 78 and 79 are carried by the glass member 77, these indexes 78 and 79 being painted on the glass or otherwise provided thereon. The pair of vertically extending indexes 78 and 79 are spaced from each other by the distance $a$ indicated in FIG. 14, and this distance is equal to the diameter of the punch 18. As is shown in FIG. 14, a substantially semi-circular mark 78' is located to the right of and directly next to the index 78, while a similar semi-circular mark 79' is located just to the left of and directly next to the index 79. These marks 78' and 79' indicate the cutting edge portion of the punch 18 to which the particular indexes 78 and 79 apply.

The operation of the index means shown in FIG. 14 is illustrated diagrammatically in FIG. 15, whereby it is assumed that it is desired to cut, in the direction of arrow 80 in FIG. 15, a simple substantially rectangular opening 60' from the work sheet 60. When the operator wants to cut a slot in the direction of the arrow 80, he has to advance the work sheet 60 in the opposite direction. Now, he has to read the portion of the scale 75 which is indicated by the index 78. However when moving the work sheet 60 in the direction of the arrow 80 of FIG. 15, the operator knows that he must read the portion of scale 75 which is aligned with the index 79.

The transverse carriage 43 carries on the top surface of the horizontal wall thereof an elongated scale 81 (FIG. 14), so that this scale moves with the transverse carriage 43, and a window 82 is supported over the scale 81 by the upper portion of the member 44 of the right guide means 41. This window 82 is supported on the member 44 shown in FIG. 14 by any suitable brackets so as to be easily accessible to the operator who can look downwardly through the window 82 onto the scale 81, and this window 82 remains stationary while the scale 81 moves together with the carriage 43. This window 82 carries at its transparent glass portion the markings indicated in FIG. 15. Thus, in this case also there are a pair of indexes 83 and 84 spaced from each other by a distance equal to the diameter of the punch 18, and since the scale moves with respect to the window, the symbols 83' and 84' are located between the indexes 83 and 84, as indicated in FIG. 15. Thus, when the work sheet 60 is transversely advanced, as, for example, in the direction of the arrow 85 of FIG. 15 and a slot is cut opposite that direction, the operator will read the scale 81 at the index 84, and when the work sheet 60 is advanced in the direction opposite to the arrow 85 the operator will read the portion of the scale 81 which is aligned with the index 83. Thus, the operator can directly ascertain the length of the cut from the scales and is not required to make mental corrections for the diameter of the punch.

Both of the scales 75 and 81 are, in the example shown, adjusted in such a way that they will give accurate readings when the work sheet—to be fastened on the gripping device 59—is located with its lower right corner of FIG. 15 against a stop 99, shown in FIG. 15. The stop 99 which may be formed integrally with the work gripping device 59 shown at the lower part of FIG. 15, is formed with a rectangular stop surface adapted to cooperate with the edges which form the lower right corner of the work sheet 60 in FIG. 15. Both of the scales 75 and 81 are so adjusted as to give zero reading when both of the carriages are so positioned that the axis of the punch will be aligned with the intersection of the stop surfaces of the stop member 99. Thus, the scales always indicate the distance of the punch from the corner of the work piece which is in engagement with the stop 99. If desired, the windows 76 and 82 may be provided with a central index 97 and 98 respectively, located midway between the pair of indexes 78 and 79 in the case of the window 76 and midway between the indexes 83 and 84 in the case of the window 82, so that such a central index will indicate the position of the axis of the punch.

If it is desired, for example, to cut from the work sheet an opening, as indicated in FIG. 15, this opening having a length $u$ and a width $v$, and being spaced from the edges of the work sheet 60 by the distances $x$ and $y$ indicated in FIG. 15, then after clamping the work sheet 60 in the position indicated in FIG. 15 where its lower right corner, as viewed in FIG. 15 engages the stop 99, it is only necessary to move the longitudinal carriage so as to provide alignment between the index 79 with the value on the scale 75 which corresponds to the value $x$, and then the carriage 43 is moved so as to align the index 84 of the window 82 with the value on the scale 81 which corresponds to the distance $y$. Once the work sheet has been positioned in this way, it is possible to cut the opening 60′ simply by moving the work sheet into the positions in which the distance $x+u$ is to be read on the index 78 of scale 75 and the distance $y+v$ on the index 83 of scale 81.

In order to form circular cutouts, the template carrying carriage 100 has mounted thereon the structure shown in FIG. 16. Thus, a block 202 is adjustably fixed to the carriage 100 in any suitable way, and this block 202 pivotally supports at 201 an elongated lever 200 which is turnable about the vertical axis of the pivot pin 201. The lever 200 is formed in its upper face with a longitudinal groove 203, and a block 204 is slidable along the groove 203 and may be fixed to the lever 200 in any suitable way, as by providing any suitable clamping device for this purpose. For example, the lever 203 may be provided with a longitudinal slot through which a threaded extension of the block 204 extends so that a nut on this extension at the exterior of the lever 200 may be tightened in order to fix the block 204 at any desired radial distance from the turning axis of the lever 200. With this construction it is only necessary for the operator to place the projection 73 extending downwardly from the block 71 into an upwardly directed recess 205 of the block 204. The projection 73 may be slidably carried by the block 71 so as to be movable upwardly and downwardly into the recess 205 upon axially shifting of the projection 73. With the carriage 100 longitudinally fixed on the lower arm 11, the block 202 fixed on the carriage 100, and with the block 204 fixed on the lever 200, it is only necessary for the operator to actuate the handle 72 so as to cause the pin 73 to move the lever 203 around the axis of the pivot pin 201, and a circle will be cut in the work sheet. The lever 203 may be provided with a scale which indicates the radial distance of the block 204 from the axis of the pivot pin 201, so that in this way the radius of the circular cutout will be determined by means of a window, not shown, with indexes and symbols, in similar way as described above in connection with determining the positions of the carriages 29 and 43.

In order to determine the center of the circular cutout with respect to the outer periphery of the work sheet 60, the above-described scales 75 and 81 are used in the above-described manner. The position of the center of the circular cutout is determined by longitudinally moving the carriage 100 along the arm 11 and fixing the carriage 100 at a predetermined position along the arm 11 through the device 104. The member 202 may have the same construction as the element 132 shown in FIG. 6, only in this case the element 132 is provided at its top end with the pivot pin 201. In the same way this member 202 is slidable along a rail 135, and it may be fixed to this rail at any desired position therealong through any suitable device, as, for example, a screw extending horizontally into engagement with the right face of the rail 135, as viewed in FIG. 6, threadedly through a horizontal bore of the block 202 which is similar to the member 132 of FIG. 6. Thus, the position of the axis of the pivot pin 201 is fixed in this way both longitudinally and transversely. With the work sheet 60 engaging the stop 99 in the manner shown in FIG. 15 and with the recess 205 aligned with the turning axis of the pivot pin 201, it is possible to read from the scales 75 and 81 the position of the center of the circular cutout on the work sheet, and for this purpose the indexes 97 and 98 shown in FIG. 15 will be used, these indexes being respectively located midway between the indexes 78, 79 and 83, 84, in the manner described above, and indicating the position of the axis of the punch 18. In other words, when the projection 73 is axially aligned with the turning axis of the pivot pin 201, the reading given by the scales 75 and 81 will directly show the position of the center of the circle on the work sheet.

As is apparent from the above description, only a part of the cutting edge of the punch 18 is used once the elongated slot has been started in the work sheet. Moreover, due to the feeding of the work sheet in a given direction with respect to the punch, the work sheet tends to bend the punch out of alignment with the die, and as a result both the punch and the die will become rapidly worn. In order to overcome this disadvantage the structure shown in FIGS. 17–19 is provided. As may be seen from FIGS. 17–19, the punch 18 is formed with an axial bore 18′ extending upwardly from its bottom cutting end. The work sheet 60 is shown beneath the punch 18 resting on the die 13 which is supported in a known way. A lower stationary part 214 which is carried by the arm 11 at its front end serves to support a cylindrical member 215 which guides for axial movement a guide pin 216. The top portion of the guide or holder 215 is formed with an axial bore through which the pin 216 is axially slidable, and beneath this top portion the guide 215 is formed with an axial bore 219 of a larger diameter in which an enlarged portion 218 of the pin 216 is slidable, this portion 218 forming a piston which is slidable in the cylindrical bore 219 of the guide member 215.

The guide pin 216 has a diameter smaller than that of the punch 18 and is adapted to extend slidably into the axial bore 18′ thereof. This guide pin 216 is shown in its operating position in FIG. 19. As may be seen from FIG. 19, the guide pin 216 extends with clearance through the opening of the die 13 into the bore 18′, so that during the vertical reciprocating movement of the punch 18 between the positions shown in FIGS. 18 and 19, the guide pin 216 will prevent any tendency of the punch to bend out of alignment with the opening of the die 13, as a result of the feeding movement of the work sheet 60, and in this way rapid wear of the punch and die will be avoided. Of course, the guide pin 216 is coaxial with the punch 18.

FIG. 17 illustrates the position of the parts at the start of the operation. At this time, the guide pin 216 is retracted to an idle position shown in FIG. 17 where the guide pin 216 does not project upwardly beyond the guide cylinder 215. At this time the punch 18 is free to move down to the position shown in FIG. 18 so as to cut from the work sheet a portion 217 indicated in FIG. 18, and it will be noted that this retraction of the guide pin 216 to the idle position shown in FIGS. 17 and 18 locates the guide 216 out of the way of the member 217 so that the latter is free to fall. After this first opening is formed in the work sheet, the guide pin 216 is raised to its upper position shown in FIG. 19, so that it extends upwardly beyond the die and the work sheet into the bore 18′ and is located in the bore 18′ even when the punch is at the top of its stroke.

As is apparent from FIG. 19, the guide pin 216 will not only guide the punch 18 so as to counteract any tendency of the work to press against one side of the punch so as to bend the latter out of alignment with the die, but in addition this guide pin 216 will engage an edge of the opening formed in the work sheet 60 so as to limit the advance of the work sheet 60 and thus limit the amount of material cut from the work sheet during each cutting stroke of the punch 18. The portions of the material cut away from the work sheet 60 while the guide pin 216 is in the operating position thereof shown in FIG. 19 can fall freely downwardly alongside of and beyond the elements 214 and 215.

Any suitable structure may be provided for raising and lowering the guide pin 216. For example, it may be raised and lowered by hand, or a suitable pull wire may be provided for this purpose. Also, any electrical structure may be provided to raise and lower the guide pin 216. In the illustrated example the guide pin 216 is raised and lowered either hydraulically or pneumatically. Thus, a suitable pressure fluid may be located within the cylindrical opening 219 beneath the piston 218, and through suitable valves this pressure fluid may be admitted for raising the guide pin 216 from the position of FIGS. 17 and 18 to that of FIG. 19, and the pressure may be reduced for retracting the guide pin back to the rest position thereof shown in FIGS. 17 and 18.

It will be understood that each of the elements described above, or two or more together, may also find a useful application in other types of machine tools differing from the types described above.

While the invention has been illustrated and described as embodied in punch presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic of specific aspects of this invention and, therefore, such adaptions should and are intended to be comprehended within the meaning and range of equivalence of the following claims.

What is claimed as new and desired to be secured by Letters Patent is:

1. In a machine for cutting sheets of metal or the like, in combination, punch press means for cutting a work sheet, said punch press means including upper and lower substantially horizontal arms, a reciprocable punch carrier located adjacent a front end of said upper arm and a die carrier located adjacent a front end of said lower arm beneath said punch carrier, said upper and lower arms respectively extending rearwardly from said punch and die carriers and being spaced from each other; a pair of elongated guide rails respectively fixed to opposite side faces of said upper arm adjacent a lower end face thereof which is directed toward said lower arm, said guide rails being parallel to each other and extending horizontally along said upper arm; a substantially U-shaped carriage embracing a lower portion of said upper arm, said carriage having a pair of opposed side walls and a lower portion extending between and interconnecting said side walls, said lower portion being located beneath said upper arm between the latter and said lower arm and said side walls extending upwardly from said lower portion and being respectively located beside said guide rails with the latter located between said side walls; and roller means carried by said side walls and engaging said guide rails for rolling movement with respect thereto, said roller means cooperating with said guide rails for guiding said carriage for movement along said rails toward and away from said punch carrier and for preventing movement of said carriage either vertically or laterally with respect to said upper arm; a second carriage extending across said first carriage beneath said lower wall thereof, said first carriage having a wall extending parallel to said second carriage downwardly from said lower wall thereof and located to the rear of said second carriage, said second carriage being in the form of an elongated T-bar having a rear wall extending substantially parallel to said wall of said first carriage which extends downwardly from said lower wall thereof and having a substantially horizontal web extending forwardly from said rear wall; roller means carried by said wall of said first carriage which extends downwardly from said lower wall thereof and cooperating with upper and lower edges of said rear wall of said T-bar for guiding the latter for movement transversely of said arm and first carriage; and work holding means connected to said web of said second carriage for holding a sheet in a predetermined plane while it is acted upon by said punch press means, whereby said first and second carriages are capable of moving the sheet in any direction in said plane while it is being cut by said punch press means.

2. In a machine for cutting sheets of metal or the like, in combination, punch press means including upper and lower substantially horizontal elongated arms and a reciprocal punch carrier and a die carrier respectively carried by said arms adjacent front ends thereof; first carriage means longitudinally supported on and movable along said upper arm toward and away from said punch carrier and having a lower wall portion located between said arms and provided with a front face directed toward said carriers; an elongated substantially horizontal T-bar located between and extending transversely of said arms and having a rear wall located just in front of and being substantially parallel to said front face of said lower wall portion of said first carriage means, said rear wall of said T-bar being of a dovetail cross section and having oppositely inclined upper and lower horizontal edges, said rear wall having a rear face directed toward said front face of said lower wall portion of said first carriage means and being wider than a front face of said rear wall which is directed toward said carriers, and said T-bar having a substantially horizontal web extending forwardly from said front face of said rear wall of said T-bar; a first pair of oppositely inclined rollers carried by said lower wall portion of said first carriage means, extending forwardly of said front face thereof, and respectively being in rolling engagement with said upper and lower edges of said rear wall of said T-bar to guide the latter for movement transversely of said arms of said punch press means; and a third roller turnably carried by said first carriage means and having a substantially vertical axis, said third roller engaging the rear face of said T-bar and being in rolling engagement therewith, said T-bar constituting a second carriage means guided by said first carriage means for movement transversely of said arms; and holding means carried by said web of said T-bar for holding a work sheet in a predetermined plane while it is being cut by said punch press means, whereby the work sheet can be moved in all directions in said plane by said first and second carriage means.

3. In a machine for cutting sheets of metal or the like, in combination, punch press means for cutting a work sheet, said punch press means including upper and lower substantially horizontal arms spaced from each other and a reciprocable punch carrier and a die carrier respectively located at adjacent front ends of and carried by said upper and lower arms; first carriage means supported on and longitudinally movable along said upper arm toward and away from said punch carrier and located at least in part between said upper and lower arms; means cooperating with said first carriage means and upper arm for releasably fixing said first carriage means to said upper arm; second carriage means carried by said first carriage means between said upper and lower arms for movement transversely of said arms; means cooperating with said second and first carriage means for releasably fixing said second carriage means to said first carriage means;

and work holding means carried by said second carriage means for holding a work sheet in a given plane while it is acted upon by said punch press means and said first and second carriage means being capable of moving said work sheet in any direction in said plane.

4. In a machine for cutting sheets of metal or the like, in combination, punch press means for cutting a work sheet, said punch press means including upper and lower horizontal arms, a reciprocable punch carrier carried by said upper arm adjacent a front end thereof, and a die carrier carried by said lower arm adjacent a front end thereof beneath said punch carrier; first carriage means supported on and longitudinally movable along said upper arm toward and away from said punch carrier and having a portion located beneath said upper arm between the latter and said lower arm; second carriage means carried by said portion of said first carriage means between said arms and supported by said first carriage means for movement transversely of said arms, said second carriage means including a web extending horizontally from said first carriage means toward said carriers; a pair of slide blocks longitudinally slidable along said web transversely of said arms; and a pair of work sheet gripping means respectively pivotally carried by said blocks forwardly of said web for free turning movement about a horizontal axis, so that said pair of gripping means can grip a work sheet at an edge thereof and support the same while it is acted upon by said punch press means, said first and second carriage means being capable of moving the work sheet in any direction in its own plane, each of said gripping means including upper and lower jaws which cooperate with each other to grip the work sheet therebetween and one of said jaws of each of said gripping means having a shoulder against which an edge of the work sheet is adapted to be located.

5. In a machine for cutting sheets of metal or the like, in combination, punch press means for cutting a work sheet, said punch press means including upper and lower horizontal arms, a punch carrier reciprocably carried by said upper arm adjacent a front end thereof, and a die carrier carried by said lower arm adjacent a front end thereof beneath said punch carrier; first carriage means supported on and longitudinally movable along said upper arm toward and away from said punch carrier and having a lower portion located beneath said upper arm between the latter and said lower arm; second carriage means carried by said lower portion of said first carriage means for longitudinal movement with said first carriage means along said upper arm and supported by said first carriage means for movement transversely of said arms; holding means carried by said second carriage means for holding a work sheet in a predetermined plane while it is being acted upon by said punch press means, so that the sheet can be moved in all directions in said plane by said first and second carriage means; block means longitudinally movable along said second carriage means and being releasably fixed thereto at a predetermined position therealong; a handle fixed to and extending from said block means, so that the operator may hold said handle to control the movement of said first and second carriage means and thereby control the path along which the work sheet is cut by said punch press means; and a projection fixed to and extending from said block means and adapted to cooperate with a device for controlling the movement of said first and second carriage means.

6. In a machine for cutting sheets of metal or the like, in combination, punch press means for cutting a work sheet, said punch press means including upper and lower substantially horizontal arms and a punch carrier and die carrier respectively carried by said upper and lower arms adjacent front ends thereof with said die carrier located beneath said punch carrier; first carriage means longitudinally movable along said upper arm toward and away from said punch carrier; first elongated scale means extending horizontally along an exterior side surface of said upper arm longitudinally thereof; first index means carried by said first carriage means for movement therewith and cooperating with said scale for indicating the extent of movement of said first carriage means; second carriage means carried by said first carriage means between said arms for longitudinal movement with said first carriage means and supported by said first carriage means for movement transversely of said arms, said second carriage means having an elongated upper edge portion extending transversely of said arms; a second elongated scale carried by said upper edge portion of said second carriage means so that said second scale moves with said second carriage means; and second index means carried by said first carriage means and cooperating with said second scale for indicating the extent of movement of said second carriage means transversely with respect to said first carriage means, said punch carrier being adapted to carry a punch of a predetermined diameter and each of said index means including a pair of index marks which are spaced from each other by a distance equal to the diameter of the punch.

7. In a machine for cutting sheets of metal or the like, in combination, punch press means for cutting a work sheet, said punch press means including upper and lower substantially horizontal arms and a punch carrier and die carrier respectively carried by said upper and lower arms adjacent front ends thereof with said die carrier located beneath said punch carrier; first carriage means longitudinally movable along said upper arm toward and away from said punch carrier; first elongated scale means extending horizontally along an exterior side surface of said upper arm longitudinally thereof; first index means carried by said first carriage means for movement therewith and cooperating with said scale for indicating the extent of movement of said first carriage means; second carriage means carried by said first carriage means between said arms for longitudinal movement with said first carriage means and supported by said first carriage means for movement transversely of said arms, said second carriage means having an elongated upper edge portion extending transversely of said arms; a second elongated scale carried by said upper edge portion of said second carriage means so that said second scale moves with said second carriage means; and second index means carried by said first carriage means and cooperating with said second scale for indicating the extent of movement of said second carriage means transversely with respect to said first carriage means, said punch carrier being adapted to carry a punch of a predetermined diameter and each of said index means including a pair of index marks which are spaced from each other by a distance equal to the diameter of the punch, and each index means being provided with indicia cooperating with said marks for indicating which portion of the cutting edge of the punch cooperates with said marks of each index means.

8. In a machine for cutting sheets of metal or the like, in combination, punch press means for cutting a work sheet, said punch press means including upper and lower substantially horizontal arms and a punch carrier and die carrier respectively carried by said upper and lower arms adjacent front ends thereof with said die carrier located beneath said punch carrier; first carriage means longitudinally movable along said upper arm toward and away from said punch carrier; first elongated scale means extending horizontally along an exterior side surface of said upper arm longitudinally thereof; first index means carried by said first carriage means for movement therewith and cooperating with said scale for indicating the extent of movement of said first carriage means; second carriage means carried by said first carriage means between said arms of longitudinal movement with said first carriage means and supported by said first carriage means for movement transversely of said arms, said second carriage means having an elongated upper edge portion extending transversely of said arms; a second elongated scale carried by said upper edge portion of said second carriage means so that said second scale moves with said second carriage means; and second index means carried by said first carriage means and cooperating with said second scale for indicating the extent of movement of said second carriage means transversely with respect to said first carriage means, said punch carrier being adapted to carry a punch of a predetermined diameter and each of said index means including a pair of index marks which are spaced from each other by a distance equal to the diameter of the punch, and each index means being provided with indicia cooperatnig with said marks for indicating which portion of the cutting edge of the punch cooperates with said marks of each index means, each of said index means including a transparent plate on which said marks and indicia are located.

9. In a machine for cutting sheets of metal or the like, in combination, punch press means for cutting a work sheet, said punch press means including upper and lower horizontal arms, a reciprocable punch carrier carried by said upper arm adjacent a front end thereof, and a die carrier carried by said lower arm adjacent a front end thereof beneath said punch carrier; first carriage means longitudinally movable along said upper arm toward and away from said punch carrier and having a lower portion located between said arms; second carriage means carried by said first carriage means for longitudinal movement therewith and supported by said first carriage means for movement transversely of said arms; a first block fixedly carried by said second carriage means; a handle fixed to said first block so that the operator may grasp said handle to move said first and second carriage means; an elongated projection fixed to and extending downwardly from said first block; third carriage means longitudinally movable along said lower arm toward and away from said die carrier; means cooperating with said lower arm and third carriage means for fixing the latter at a given position along said lower arm; a lever carried by said third carriage means for turning movement with respect to the latter around a vertical axis; and a second block carried by said lever adjustable in longitudinal direction of the latter, said second block being formed at a top face thereof with a recess into which a lower end portion of said projection extending from said first block is adapted to extend for connecting said projection to said second block; and holding means carried by said second carriage means for holding a work sheet in a given plane while it is being cut by said punch press means, said first and second carriage means cooperating to move said work sheet in all directions in said plane, whereby said first block may be connected to said lever to be moved by the operator along a circle whose center is in said axis in order to move said first and second carriage means for moving the work sheet along a circle with respect to a punch carried by the punch carrier so that the punch press means will cut from the work sheet a circular plate whose diameter is equal to the diameter of the circle along which said first block is moved.

10. In a machine for cutting sheets of metal or the like, in combination, punch press means for cutting a work sheet; holding means for holding the work sheet in a given plane while it is cut by said punch press means; moving means carried by said punch press means and supporting said holding for moving the latter together with the work sheet in all directions in said plane; support means carried by said punch press means for supporting a positive template and a mating negative template; a driven feed roll carried by said moving means and cooperating with said negative template for automatically actuating said moving means to move said holding means and the work sheet therewith in said plane according to the shape of said negative template; and an elongated feeler coaxial with said feedroll and cooperating with said positive template while the feed roll moves along the negative template.

11. In a machine for cutting sheets of metal or the like, in combination, punch press means for cutting a work sheet; holding means for holding the work sheet in a given plane while it is cut by said punch press means; moving means carried by said punch press means and supporting said holding means for moving the latter together with the work sheet in all directions in said plane; support means carried by said punch press means for supporting a positive template and a mating negative template; a driven feed roll carried by said moving means and cooperating with said negative template for automatically actuating said moving means to move said holding means and the work sheet therewith in said plane according to the shape of said negative template; and an elongated feeler coaxial with said feedroll and cooperating with said positive template while the feed roll moves along the negative template, said support means supporting the positive and negative templates in different horizontal planes, respectively.

12. In a machine for cutting sheets of metal or the like, in combination, punch press means for cutting a work sheet; holding means for holding a work sheet in a given plane while it is cut by said punch press means; moving means cooperating with said holding means for moving the latter and the work sheet therewith in all directions in said plane, said moving means being carried by said punch press means; support means carried by said punch press means for supporting cooperating positive and negative templates; a motor driven feed roll carried by said moving means and cooperating with said negative template for moving therealong to automatically actuate said moving means according to the configuration of said negative template; and a feeler roll coaxial with said feed roll and cooperating with said positive template while said feed roll cooperates with said negative template, said feeler roll having a diameter which corresponds to the diameter of a punch acting on the work sheet.

13. In a machine for cutting sheets of metal or the like, in combination, press punch means for cutting a work sheet, said press punch means including upper and lower arms and a reciprocable punch carried by said upper arm adjacent a front end thereof and a die carried by said lower arm adjacent a front end thereof beneath said punch to cooperate therewith for cutting the sheet; first carriage means longitudinally movable along one of said arms and located between said arms, said first carriage means being movable toward and away from the front ends of said arms; second carriage means carried by said first carriage means for movement transversely of said arms; work holding means carried by said second carriage means for holding a work sheet in a predetermined plane while it is being cut by said punch press means, said first and second carriage means cooperating to move said work sheet in all directions in said plane; a driving motor carried by said second carriage means for movement therewith; a feed roller carried and driven by said driving motor and adapted to cooperate with an edge of a template for automatically feeding said first and second carriage means in a manner which will move the work sheet to cause the punch press means to cut along the work sheet along a path the same as that of the edge with which said feed roller cooperates, said feed roller cooperating with a negative edge of a template; and feeler means coaxial with said feed roller and cooperating with a positive edge of the template.

14. In a machine for cutting sheets of metal or the like, in combination, punch press means for cutting a work sheet, said punch press means including upper and lower elongated substantially parallel substantially horizontal arms, a punch carried by said upper arm adjacent a front end thereof, and a die cooperating with said punch and carried by said lower arm adjacent a front end thereof; longitudinal carriage means carried by one of said arms for longitudinal movement therealong toward and away from the front end thereof and located between said arms; transverse carriage means carried by said longitudinal carriage means and extending transversely of said arms for movement transversely thereof with respect to said longitudinal carriage means; work holding means carried by said transverse carriage means for holding a work sheet in a given plane while the work sheet is being cut by said punch press means, said longitudinal and transverse carriage means cooperating to move the work sheet in all directions in said plane; motor means carried by said transverse carriage means for movement therewith; feed roller means carried by said motor means and being driven thereby, said feed roller means cooperating with the negative edge of a template for controlling the movement of said carriage means and the work sheet therewith, said feed roller means automatically contracting and expanding its diameter to remain in engagement with the negative edge of the template at all times; and feeler means coaxial with and extending from said feed roller means and cooperating with a positive edge of the template.

15. In a machine for cutting sheets of metal or the like, in combination, a substantially C-shaped machine frame having an upper and a lower arm extending horizontally substantially parallel and spaced from each other and being united with each other at one end thereof; reciprocating punch means mounted on the other end of one of said arms; die means mounted on the other end of the other of said arms for cooperation with said reciprocating punch means; first carriage means supported on and movable longitudinally along said upper arm between said ends thereof; second carriage means carried by said first carriage means for movement therewith longitudinally of said upper arm, said second carriage means extending transversely through the space between said arms and being movable with respect to said first carriage means transversely of said arms; work holding means carried by said second carriage means for holding a work sheet so that the latter moves with said second carriage means, whereby a work sheet may be held in a given plane and moved in said plane in all directions while being acted upon by said cooperating punch and die means; and means carried by said lower arm adjustable in direction thereof and in a direction transverse thereto and adapted to carry a device which participates in the control of the movement of said first and second carriage means.

16. In a nibbling machine for producing cutting lines proceeding in various directions in work sheets of metal or the like by successively punching out crescent-shaped chips in direction of a cutting line, in combination, a substantially C-shaped frame including a base, an upright and an arm extending substantially horizontally above said base and having a back end connected with said upright and a front end, said base and said arm defining a gap therebetween; power driven reciprocating punch means mounted on said front end of said arm; die means mounted on said base in alignment with said punch means for cooperation therewith; a carriage; stationary slide ways mounted on said frame extending in a first direction and supporting said carriage for movement in said first direction; supporting means; guiding means on said carriage for guiding said supporting means for movement in a second direction transverse to said first direction; work holding means on said supporting means for fastening a work sheet to said supporting means so that a work sheet may be held by said holding means in a given plane and move in said plane in all directions while being acted upon by said cooperating punch and die means and said punch means comprising a blanking punch adapted to successively cut out crescent-shaped chips from said work sheet irrespective of the direction of movement thereof; first locking means cooperating with said carriage for locking the same in any adjusted position along said stationary slide ways; and second locking means cooperating with said supporting means for locking the same in any adjusted position, said first and second locking means being operable independent from each other.

17. An arrangement as defined in claim 16 in which said blanking punch has a circumferential cutting edge.

18. An arrangement as defined in claim 16 and including a template support fastened to said frame and adapted to adjustably carry a template; and guide means on said supporting means for cooperation with a template fastened to said template support.

19. In a machine for cutting sheets of sheet metal or the like, a substantially C-shaped frame having substantially parallel horizontally extending upper and lower arms spaced from each other and being united with each other at one of the ends thereof; reciprocating punch means; die means aligned with and cooperating with said punch means for cutting a slot in a sheet metal or the like fed between said punch and die means, said punch and die means being respectively mounted on the other ends of said arms; first carriage means supported on and movable longitudinally along one of said arms; second carriage means carried by the first carriage means for movement therewith longitudinally of said one arm, said second carriage means extending transversely through the space between said arms and being movable with respect to said first carriage means transversely to the arms; work holding means carried by said second carriage means for holding a work sheet so that the latter moves with said second carriage means, whereby a work sheet may be held in a given plane and move in said plane in all directions while being acted upon by said cooperating punch and die means; first locking means cooperating with said first carriage means for locking the same in any adjusted position along said one arm; and second locking means cooperating with said second carriage for locking the same in any adjusted position relative to said first carriage means, said first and second locking means being operable independent from each other.

20. In a nibbling machine, in combination, a first support; a second support vertically spaced from said first support so as to define a gap between said supports, each of said supports having a front end aligned with the front end of the other support; cooperating punch and die means respectively mounted on said front ends of said supports aligned with each other; stationary slide ways mounted on one of said supports; a first carriage supported on said slide ways for movement in a first direction along said gap; guiding means on said first carriage and extending in a second direction transverse to said first direction; a second carriage supported on and guided by said guiding means for movement in said second direction; work holding means on said second carriage for fastening a work sheet to said second carriage so that a work sheet may be held by said work holding means in a given plane and moved in said plane in all directions while being acted upon by said cooperating punch and die means; first locking means cooperating with said first carriage for locking the same in any adjusted position along said stationary slide ways; and second locking means cooperating with said second carriage for locking the same in any adjusted position with respect to said first carriage, said first and second locking means being operable independent from each other.

21. In a nibbling machine, in combination, a first support; a second support vertically spaced from said first support so as to define a gap between said supports, each of said supports having a front end aligned with the front end of the other support; cooperating punch and die means respectively mounted on said front ends of said supports aligned with each other; stationary slide ways mounted on one of said supports and extending in the entirety rearwardly of the front end thereof; a first carriage supported on said slide ways for movement in a first direction along said gap, said first carriage having a wall portion extending transversely through said gap; guiding means on said wall portion of said first carriage and extending in a second direction transverse to said first direction; a second carriage in form of an elongated bar extending with a portion thereof through said gap and being supported on and guided by said guiding means for movement in said second direciton; work holding means carried by said elongated bar adjustable in longitudinal direction of the latter for fastening a work sheet to said second carriage so that a work sheet may be held by said work holding means in a given plane and moved in said plane in all directions while being acted upon by said cooperating punch and die means; first locking means cooperating with said first carriage for locking the same in any adjusted position along said stationary slide ways; and second locking means cooperating with said second carriage for locking the same in any adjusted position with respect to said first carriage, said first and second locking means being operable independent from each other.

22. In a nibbling machine, in combination, a first support; a second support vertically spaced from said first support so as to define a gap between said supports, each of said supports having a front end aligned with the front end of the other support; cooperating punch and die means respectively mounted on said front ends of said supports aligned with each other; a first stationary slide ways mounted on one of said supports and extending in the entirety rearwardly of the front end thereof; a first carriage supported on said first slide ways for movement in a first direction along said gap, said first carriage having a wall portion extending transversely through said gap; guiding means on said wall portion of said first carriage and extending in a second direction transverse to said first direction; a second carriage in form of an elongated bar extending with a portion thereof through said gap and being supported on and guided by said guiding means for movement in said second direction; work holding means carried by said elongated bar adjustable in longitudinal direction of the latter for fastening a work sheet to said second carriage so that a work sheet may be held by said work holding means in a given plane and moved in said plane in all directions while being acted upon by said cooperating punch and die means; first locking means cooperating with said first carriage for locking the same in any adjusted position along said stationary slide ways; second locking means cooperating with said second carriage for locking the same in any adjusted position with respect to said first carriage, said first and second locking means being operable independent from each other; second stationary slide ways mounted on one of said supports and extending substantially parallel to said first stationary slide ways; a second elongated bar extending transverse to said first direction and being supported on said second stationary slide ways for movement in said first direction; additional locking means cooperating with said second elongated bar for locking the same in any adjusted position along said second slide ways; a template mounted on said second elongated bar adjustable in longitudinal direction thereof; and means mounted on said second carriage and adapted to cooperate with said template.

23. In a nibbling machine, in combination, a frame including a base, an upright, and an arm extending substantially horizontally above said base and having a back end connected with said upright and a front end, said base and said arm defining a gap therebetween; reciprocating punch means mounted on said front end of said arm; die means mounted on said base in alignment with said punch means for cooperation therewith; a carriage; stationary slide ways mounted on said frame extending in a first direction and supporting said carriage for movement in said first direction; supporting means; guiding means on said carriage for guiding said supporting means for movement in a second direction transverse to said first direction; work holding means on said supporting means for fastening a work sheet to said supporting means so that a work sheet may be held by said holding means in a given plane and move in said plane in all directions while being acted upon by said cooperating punch and die means; first locking means cooperating with said carriage for locking the same in any adjusted position along said stationary slide ways; second locking means cooperating with said supporting means for locking the same in any adjusted position, said first and second locking means being operable independent from each other; a support fastened to said frame; a bracket swivel mounted on said support; and connecting means between said bracket and said support means and comprising a pivot bearing for circular movement of said supporting means by swiveling said bracket.

References Cited in the file of this patent

UNITED STATES PATENTS

| | | |
|---|---|---|
| 931,431 | Kilgore | Aug. 17, 1909 |
| 1,006,117 | Meyers | Oct. 17, 1911 |
| 1,459,320 | Corset | June 19, 1923 |
| 1,472,034 | Asquith | Oct. 30, 1923 |
| 2,177,087 | Akerlind | Oct. 24, 1939 |
| 2,557,797 | Rand | June 19, 1951 |
| 2,673,611 | Seybod | Mar. 30, 1954 |
| 2,808,765 | Gunderson | Oct. 8, 1957 |
| 2,934,107 | Hawkins | Apr. 26, 1960 |